(12) United States Patent
Whelen (10) Patent No.: US 11,202,187 B2
(45) Date of Patent: Dec. 14, 2021

(54) SYSTEM AND METHOD FOR OPERATING STEALTH MODE OF EMERGENCY VEHICLE

(71) Applicant: WHELEN ENGINEERING COMPANY, INC., Chester, CT (US)

(72) Inventor: George W. Whelen, Old Saybrook, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 16/722,361

(22) Filed: Dec. 20, 2019

(65) Prior Publication Data

US 2020/0296564 A1  Sep. 17, 2020

Related U.S. Application Data

(63) Continuation of application No. 16/351,929, filed on Mar. 13, 2019, now Pat. No. 10,555,159.

(51) Int. Cl.

| | |
|---|---|
| *H04W 4/90* | (2018.01) |
| *H04W 4/02* | (2018.01) |
| *H04W 4/021* | (2018.01) |
| *H04W 4/06* | (2009.01) |
| *H04M 11/04* | (2006.01) |
| *H04W 4/08* | (2009.01) |
| *H04W 4/48* | (2018.01) |

(Continued)

(52) U.S. Cl.
CPC ............. *H04W 4/90* (2018.02); *H04M 11/04* (2013.01); *H04W 4/021* (2013.01); *H04W 4/025* (2013.01); *H04W 4/06* (2013.01); *H04W 4/08* (2013.01); *H04W 4/46* (2018.02); *H04W 4/48* (2018.02)

(58) Field of Classification Search
None
See application file for complete search history.

(56) References Cited

U.S. PATENT DOCUMENTS

| | | |
|---|---|---|
| 4,962,532 A | 10/1990 | Kasiraj et al. |
| 6,807,409 B1 | 10/2004 | Davidson et al. |
| 7,203,318 B2 | 4/2007 | Collum et al. |

(Continued)

FOREIGN PATENT DOCUMENTS

EP  0375138 A2  6/1990

OTHER PUBLICATIONS

PCT International Search Report and Written Opinion of the International Searching Authority dated Sep. 9, 2019 in corresponding Application No. PCT/US2019/021992, 12 pages.

*Primary Examiner* — Bernarr E Gregory
(74) *Attorney, Agent, or Firm* — Hogan Lovells US LLP (57) ABSTRACT

A system, method and storage medium for operating a stealth mode of an emergency vehicle includes receiving input data including at least one of an input from an operator or one or more program input parameters; determining a data operation mode based on the received input data, wherein the data operation mode is one of a normal mode and one or more stealth modes; and generating a control signal based on the determined operation mode. When the data operation mode is one of the one or more stealth modes, the control signal is adapted to control a first device to suspend a transmission of at least one data group among candidate suspended data to at least one second device in communication with the first device.

23 Claims, 10 Drawing Sheets

(51) Int. Cl.
*H04W 4/46* (2018.01)
*H04W 4/00* (2018.01)

(56) References Cited

U.S. PATENT DOCUMENTS

| | | | |
|---|---|---|---|
| 7,636,842 B2 | 12/2009 | Kumoluyi et al. | |
| 8,195,198 B1 | 6/2012 | Shaw et al. | |
| 8,351,916 B2 | 1/2013 | Fan et al. | |
| 8,510,335 B2 | 8/2013 | Mattsson et al. | |
| 8,931,110 B2 | 1/2015 | Ganesh et al. | |
| 9,197,668 B2 | 11/2015 | Boucher et al. | |
| 9,759,574 B2 * | 9/2017 | Makled | H04W 4/46 |
| 10,110,611 B2 * | 10/2018 | Dayka | G06F 21/602 |
| 10,142,814 B2 | 11/2018 | Jatavallabhula et al. | |
| 2003/0105979 A1 * | 6/2003 | Itoh | H04L 63/105 726/24 |
| 2007/0067402 A1 * | 3/2007 | Sugii | H04L 51/30 709/206 |
| 2008/0220801 A1 | 9/2008 | Hobby et al. | |
| 2009/0041206 A1 | 2/2009 | Hobby et al. | |
| 2010/0077484 A1 * | 3/2010 | Paretti | H04W 4/023 726/26 |
| 2012/0009897 A1 | 1/2012 | Kasad et al. | |
| 2012/0066345 A1 | 3/2012 | Rayan et al. | |
| 2012/0250610 A1 * | 10/2012 | Budampati | H04L 67/125 370/328 |
| 2012/0291106 A1 * | 11/2012 | Sasaki | G06F 21/606 726/5 |
| 2013/0212659 A1 * | 8/2013 | Maher | H04W 4/44 726/6 |
| 2014/0155018 A1 | 6/2014 | Fan et al. | |
| 2015/0178999 A1 * | 6/2015 | Smith | H04W 4/60 701/31.5 |
| 2016/0219028 A1 * | 7/2016 | Baltes | H04W 4/40 |
| 2018/0025553 A1 | 1/2018 | Bajwa et al. | |
| 2019/0149960 A1 * | 5/2019 | Himmelstein | H04W 4/46 455/41.2 |

* cited by examiner

| Mode | Security Level | Suspended Data |
|---|---|---|
| Stealth Mode 3 | Level 3 (Highest Level) | Data 3a |
| Stealth Mode 2 | Level 2 | Data 2a |
| Stealth Mode 1 | Level 1 | Data 1a |
| Normal Mode | N/A | None |

FIG. 2A

| Mode | Security Level | Suspended Data |
|---|---|---|
| Stealth Mode 3 | N/A | Data 3b |
| Stealth Mode 2 | N/A | Data 2b |
| Stealth Mode 1 | N/A | Data 1b |
| Normal Mode | N/A | None |

FIG. 2B

| Mode | Security Level | Suspended Data |
|---|---|---|
| Stealth Mode 3 | Level 3 (Highest Level) | All Data (e.g., Data 1c to 3c) |
| Stealth Mode 2 | Level 2 | Data 2c and 3c |
| Stealth Mode 1 | Level 1 | Data 3c |
| Normal Mode | N/A | None |

FIG. 6

SYSTEM AND METHOD FOR OPERATING STEALTH MODE OF EMERGENCY VEHICLE

This application is a continuation of U.S. patent application Ser. No. 16/351,929, filed Mar. 13, 2019, now U.S. Pat. No. 10,555,159.

TECHNICAL FIELD

This application relates to a system or method for effectively operating a stealth mode of an emergency vehicle.

BACKGROUND

When emergency situations such as occurrences of crimes, disasters, car accidents, etc. take place, emergency vehicles will communicate with a control headquarter or another emergency vehicles to share information necessary for their own missions such as following or chasing suspects or cars driven by suspects, rescuing of victims, etc. However, the information being shared among related entities may include sensitive information on a certain emergency vehicle, so in case of the information is eavesdropped or hijacked by criminals, the whole mission can be in jeopardy.

Thus, there is a need for a system controlling emergency vehicles to be operated in a stealth mode, if necessary, where data is suspended from being transmitted.

SUMMARY OF THE INVENTION

Aspects of the present disclosure are a system, method and storage medium for operating a stealth mode of an emergency vehicle (EV).

In one aspect, there is provided a system for operating a stealth mode of an emergency vehicle (EV). The system includes comprising a controller configured to: receive input data including at least one of an input from an operator or one or more program input parameters; determine a data operation mode based on the received input data; and generate a control signal based on the determined operation mode. The data operation mode can be one of a normal mode and one or more stealth modes. When the data operation mode is one of the one or more stealth modes, the control signal is adapted to control a first device to suspend a transmission of at least one data among candidate suspended data to at least one second device in communication with the first device.

In one embodiment, the first device may be an emergency subscriber vehicle associated with the EV. The first device includes the controller. The second device may be any type of devices remotely located from the EV. For example, the second device may include a remote server at a control headquarter, and a subscriber device associated with another vehicle traveling nearby the EV.

In one embodiment, the first device may be the remote server at the control headquarter. The first device may include the controller. The second device may be any type of devices remotely located from the remote server. For example, the second device may include an emergency subscriber device associated with the EV and a subscriber device associated with another vehicle traveling nearby the EV.

In one embodiment, the one or more stealth modes may include a first stealth mode and a second stealth mode, and the candidate suspended data include first data and second data. When the data operation mode is the first stealth mode, the control signal may be adapted to control the first device to suspend the first data from being transmitted and transmit the second data. Further, when the data operation mode is the second stealth mode, the control signal may be adapted to control the first device to suspend the second data from being transmitted and transmit the first data.

In one embodiment, the one or more stealth modes may include a first stealth mode having a first security level and a second stealth mode having a second security level higher than the first security level.

In one embodiment, the control signal may be adapted to control the first device to suspend both the first data and the second data from being transmitted when the data operation mode is the first stealth mode. The control signal may be adapted to control the first device suspend the second data from being transmitted and transmit the first data when the data operation mode is the second stealth mode.

In one embodiment, the first data may correspond to the first security level, and the second data may correspond to the second security level.

In one embodiment, when the data operation mode is one of the one or more stealth modes, the control signal may be adapted to control the first device to suspend all data of the candidate suspended data from being transmitted.

In one embodiment, the control signal may be generated by a processor of the controller, and the processor coupled to memory storing program instructions may be configured to, based on the program instructions: determine the one or more program input parameters associated with the vehicle; determine the data operation mode based on the one or more program input parameters; and generate the control signal pertaining to the determined data operation mode. The one or more program input parameters may include at least one of a current location of the EV, a velocity of the EV, identification of the EV, and a current time.

In one embodiment, the candidate suspended data may include EV-related data or data generated by an operator of the EV. The EV-related data may include a location of the vehicle, a velocity of the vehicle, and an ID of the vehicle. Further, the data generated by the operator of the EV may include a conversation message of the operator with another individual at a remote site, and the conversation message may include information of an occurrence of an event and details associated with the event.

In still another aspect of the present disclosure, there is provided a method for operating a stealth mode of an emergency vehicle. The method includes receiving input data including at least one of an input from an operator or one or more program input parameters; determining a data operation mode based on the received input data. The data operation mode is one of a normal mode and one or more stealth modes. The method further includes generating a control signal based on the determined operation mode. When the data operation mode is one of the one or more stealth modes, the control signal is adapted to control a first device to suspend a transmission of at least one data group among candidate suspended data to at least one second device in communication with the first device.

In still yet another aspect of the present disclosure, there is provided a computer-readable storage medium having computer readable program instructions. The computer readable program instructions read and executed by at least one processor for performing a method for operating a stealth mode of an emergency vehicle. The method includes receiving input data including at least one of an input from an operator or one or more program input parameters; determining a data operation mode based on the received input data. The data operation mode is one of a normal mode and one or more stealth modes. The method further includes generating a control signal based on the determined operation mode. When the data operation mode is one of the one or more stealth modes, the control signal is adapted to control a first device to suspend a transmission of at least one data group among candidate suspended data to at least one second device in communication with the first device.

BRIEF DESCRIPTION OF THE DRAWINGS

The present disclosure will become more readily apparent from the specific description accompanied by the drawings.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "emergency vehicle (EV)" includes, but are not limited: a police vehicle, an ambulance, a fire truck, etc.

The term "stealth mode" refers to a mode where an EV or a remote server at a control headquarter in communication with the EV suspends at least one data from being transmitted to another device (e.g., another remotely located from the EV or the remote server).

Figure 1:
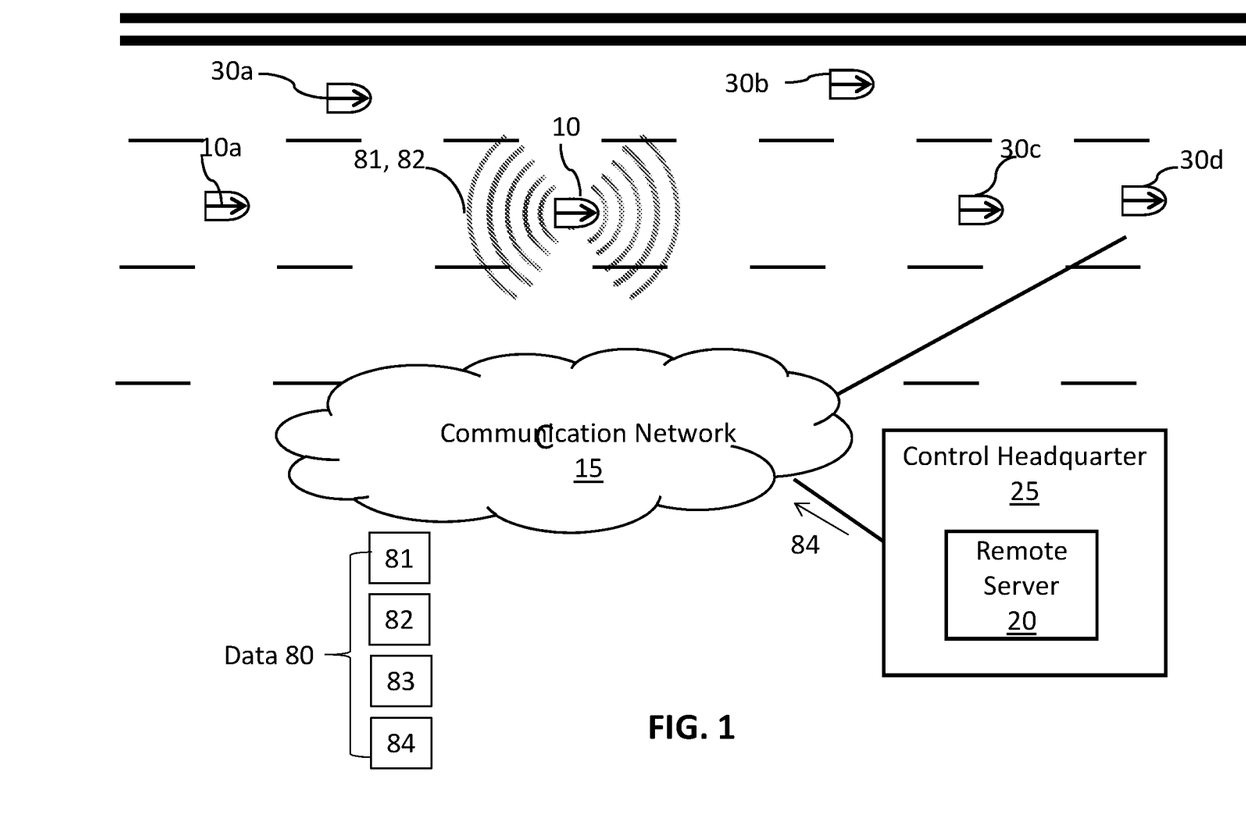
FIG. 1 depicts an example environment where an EV communicates with another entities according to an embodiment of the present disclosure.

FIG. 1 depicts an example environment where an EV 10 communicates with another entities such as another EV 10a, other vehicles 30a to 30d, and a control headquarter 25 according to an embodiment of the present disclosure.

When emergency situations such as occurrences of crimes, disasters, and car accidents, an EV 10 at interest, a peer EV 10a, a control headquarter 25 and/or other vehicles 30a to 30d (e.g. vehicles which are not EVs) may exchange various data 80 over a road through a communication network 15 or a direct wireless channel, as depicted in FIG. 1.

The Data 80 being exchanged among the above-mentioned entities may include sensitive information that should not be shared with unauthorized individuals such as surveillances, criminals, police personnel not involved in the mission of the EV 10 or operators of the EV 10, etc.

For example, in order to ensure the EV 10's safety during traveling over the road, a geofence (e.g., 81 of FIG. 3A or 84 of FIG. 3B) can be generated by the control headquarter 25 or the EV 10. The geofence refers to a safety zone of the EV 10 which allows the EV to traverse the traffic safely. Example embodiments regarding generating and transmitting of the geofence of an emergency vehicle are disclosed in Applicant's copending U.S. patent application Ser. No. 16/243,692 filed on Jan. 9, 2019, entitled "SYSTEM AND METHOD FOR VELOCITY-BASED GEOFENCING FOR EMERGENCY VEHICLE", the entire disclosure of which is incorporated by reference herein. As disclosed in U.S. patent application Ser. No. 16/243,692, filed on Jan. 9, 2019, a remote server 20 of the control headquarter 25 may generate a geofence based on an emergency indication signal (e.g., see 83 of FIG. 3A) which is transmitted from the EV 10. The emergency indication signal can include EV-related data 82 such as a location of the vehicle, a velocity of the vehicle, and an ID of the EV 10. Thus, in this case, the Data 80 being exchanged can be the EV-related data 81 transmitted from the EV 10 to the control headquarter 25 and/or the geofence 84 transmitted from the control headquarter 25 to other vehicles 30a to 30d.

In another scenario where the geofence is generated and transmitted by the EV 10, the EV 10 generates a geofence 81 based on the EV-related data 82. In this case, the Data 80 being exchanged can be the geofence 81 and/or the EV-related data 82 transmitted from the EV 10 to other vehicles.

In still another scenario where the EV 10 is a police car traveling to an emergency scene (e.g., crime scene), chasing or following suspects or cars driven by suspects (e.g., the EV 10 is an undercover police car), the Data 80 may include messages 83 exchanged among the EV 10, the EV 10a and/or the control headquarter 25. More particularly, the messages 83 exchanged among the EV 10, the EV 10a and/or the control headquarter 25 can include, but are not limited: an ID, a location, a velocity, a moving direction, etc. of a suspect or suspect vehicle which can help them to conduct their missions such as chasing or arresting the suspects or the suspect vehicle. Some of such Data 80 can be so sensitive, so in case of the information is eavesdropped or hijacked by criminals, the whole mission can be in jeopardy.

Thus, in some cases, upon receiving or detecting a control signal 350, the EV 10 is controlled to be in a stealth mode where at least a portion of the Data 80 is suspended from being transmitted, based on the control signal 350. The control signal 350 can be generated by an emergency subscriber device (see e.g., 100 FIG. 3A) of the EV 10 or the remote server 20 of the control headquarter 25.

In one embodiment, the stealth mode can be one selected from among one or more stealth modes. If the EV 10 is not in a stealth mode, the EV 10 is in a normal mode where none of the Data 80 is suspended from being transmitted. Hereinafter, the data subject to be suspended from being transmitted are referred to as "suspended data" for the sake of description.

In case of two or more stealth modes are set, the suspended data pertaining to the stealth modes can be different one from another, partially or exclusively.

For example, a certain security level is assigned to each of the suspended data based on how sensitive or important the data is. In addition, if the number of security levels is more than one, different security levels are assigned to each of the stealth modes. Information of the security levels assigned to each suspended data may be stored in memory (e.g., 202A of FIG. 2A).

Figure 2A:
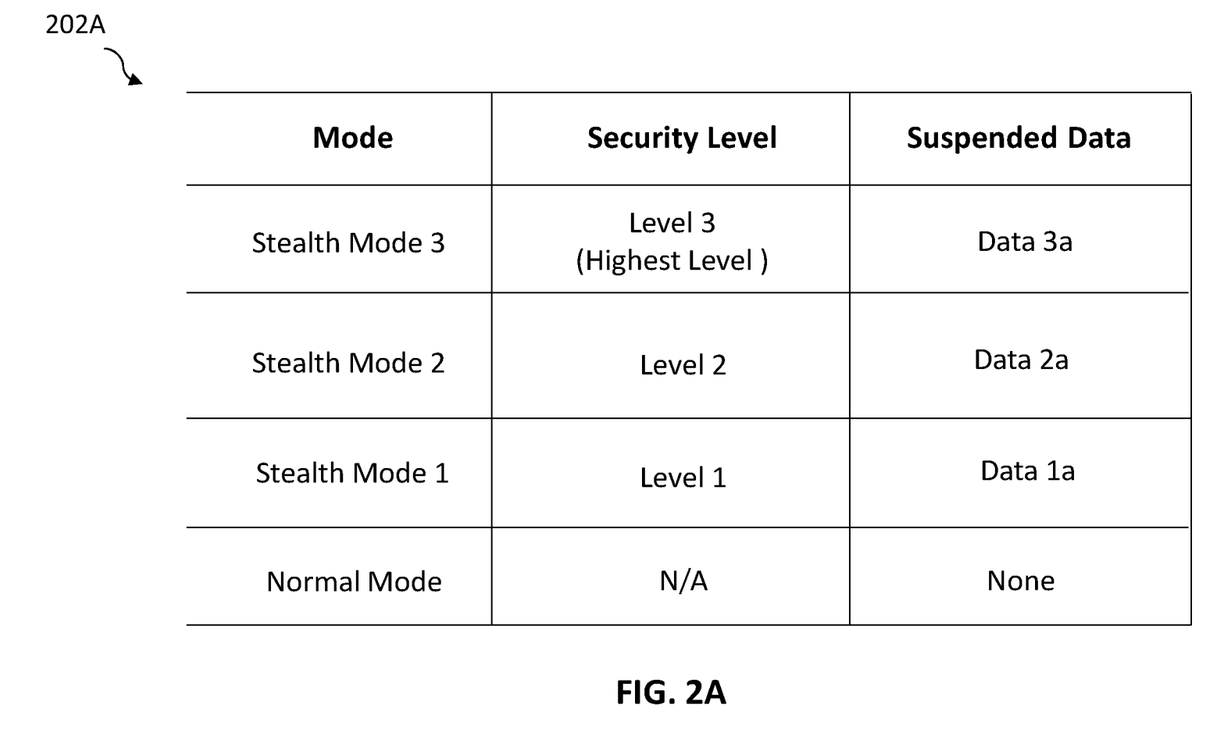
FIGS. 2A to 2C depict example mapping relationships among stealth modes, suspended data, and/or security levels according to an embodiment of the present disclosure.
Figure 2B:
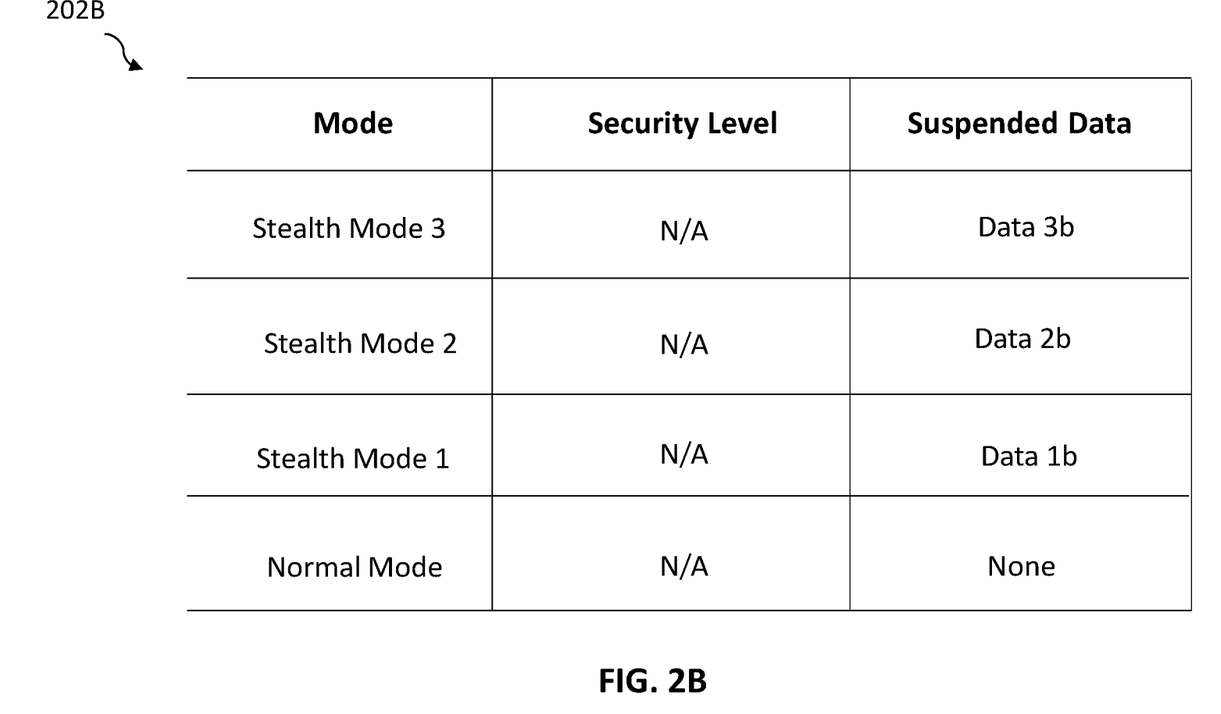
Figure 2C:
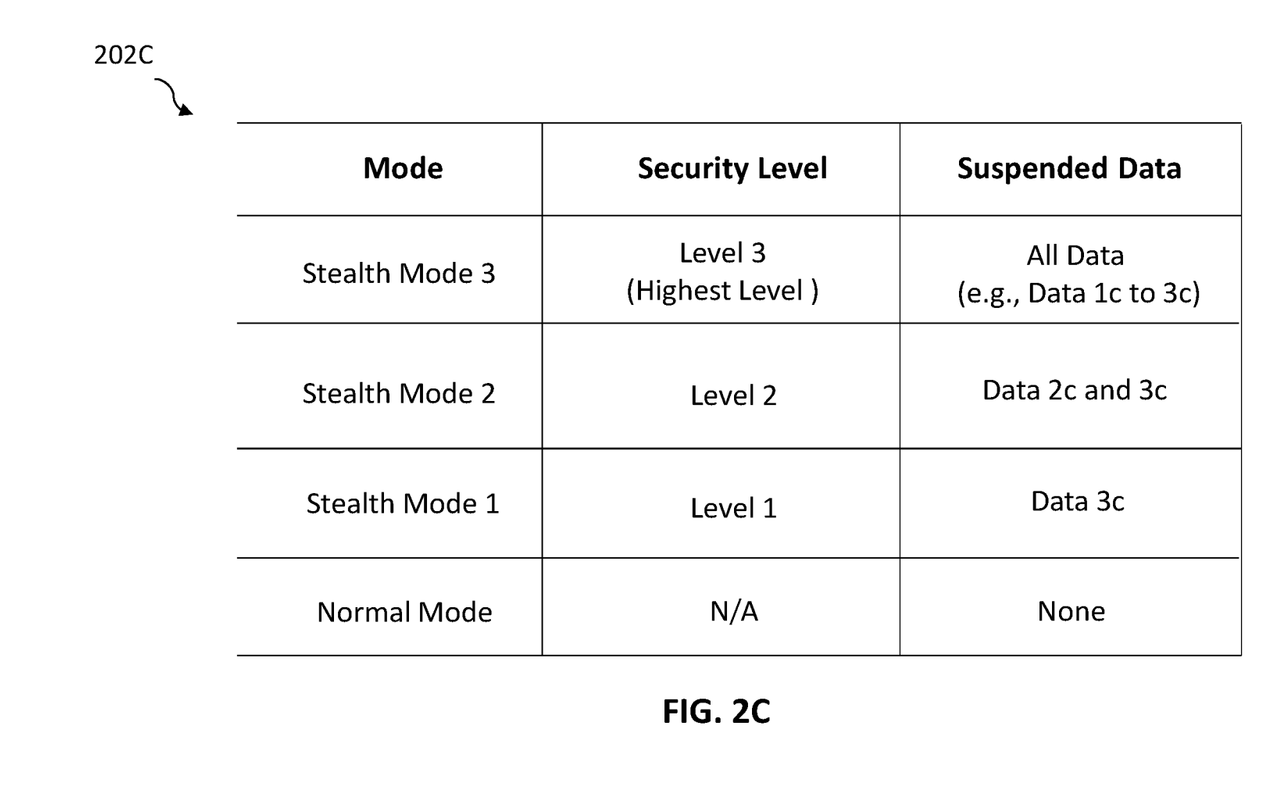

FIGS. 2A to 2C depict example mapping relationships 202A to 202C among stealth modes, suspended data, and/or security levels according to an embodiment of the present disclosure.

Referring to FIGS. 2A to 2C, it is assumed that three stealth modes are set for the sake of simplicity. However, embodiments of the present disclosure are not limited thereto. For example, the number of stealth modes can be one, two, or more than three. Data 1a to 3a of FIG. 2A, Data 1b to 3b of FIG. 2B, and Data 1c to 3c of FIG. 2C are part of the Data 80.

By way of example only, referring particularly to FIG. 2A, the stealth mode 3 is associated with the security level 3 (e.g., highest security level), and when the stealth mode 3 is determined based on the control signal 350, Data 3a is suspended from being transmitted. The stealth mode 2 is associated with the security level 2, and when the stealth mode 2 is determined based on the control signal 350, Data 2a is suspended from being transmitted. The stealth mode 1 is associated with the security level 1, and when the stealth mode 1 is determined based on the control signal 350, Data 1a is suspended from being transmitted. Here, Data 1a to 3a are assigned with the different security levels 1 to 3, respectively, and are exclusively different one from another. Further, in a normal mode, no security level is assigned and no suspended data is assigned thereto; for example, none of the Data 80 is suspended from being transmitted.

Referring now to FIG. 2B, no the security level is assigned to each stealth mode and suspended data. Data 1b to 3b are exclusively different one from another.

Referring now to FIG. 2C, the stealth mode 3 is associated with the security level 3 (e.g., highest security level), and when the stealth mode 3 is determined based on the control signal 350, all Data (e.g., Data 1c to 3c) are suspended from being transmitted; for example, none of the Data 80 can be transmitted. The stealth mode 2 is associated with the security level 2, and when the stealth mode 2 is determined based on the control signal 350, Data 1c and 2c are suspended from being transmitted. The stealth mode 1 is associated with the security level 1, and when the stealth mode 1 is determined based on the control signal 350, Data 1c is suspended from being transmitted. Here, as Data 3c has the highest security level, Data 3c remains to be suspended from being transmitted at all kinds of stealth modes 1 to 3. Further, Data 2c, which has a lower security level than Data 3c, but higher security level than Data 1c, is suspended from being transmitted at stealth modes 2 and 3 and can be transmitted in stealth mode 1. Data 1c, which has the lowest security level, is suspended from being transmitted at stealth mode 3 and can be transmitted in stealth modes 1 and 2. In this embodiment with reference to FIG. 2C, the suspended data pertaining to the stealth modes can be partially different one from another while Data 2c is commonly suspended from being transmitted in stealth modes 2 and 3 and Data 3c is commonly suspended from being transmitted in all stealth modes 1 to 3.

Figure 3A:
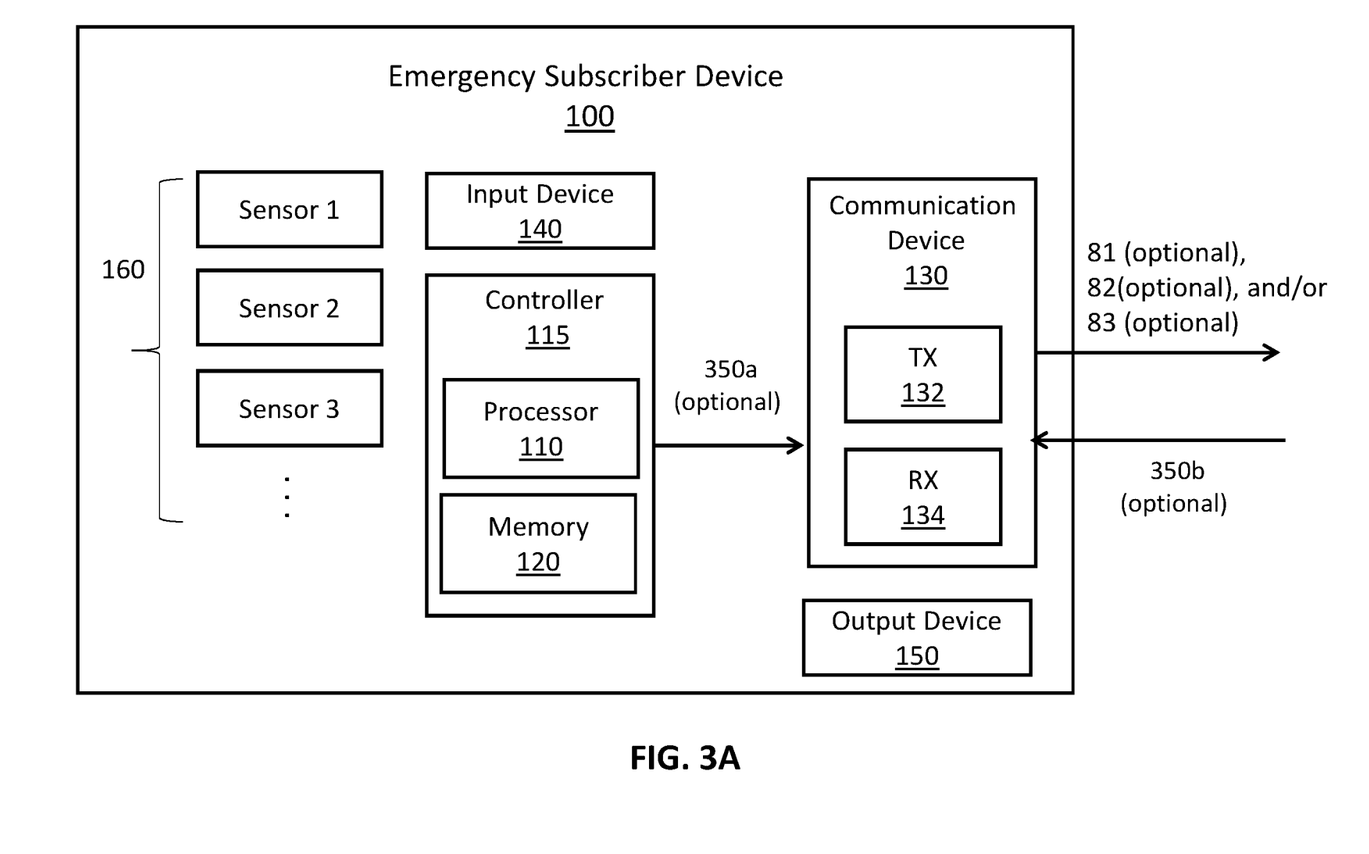
FIG. 3A is a block diagram illustrating an example emergency subscriber device according to an embodiment of the present disclosure.
Figure 3B:
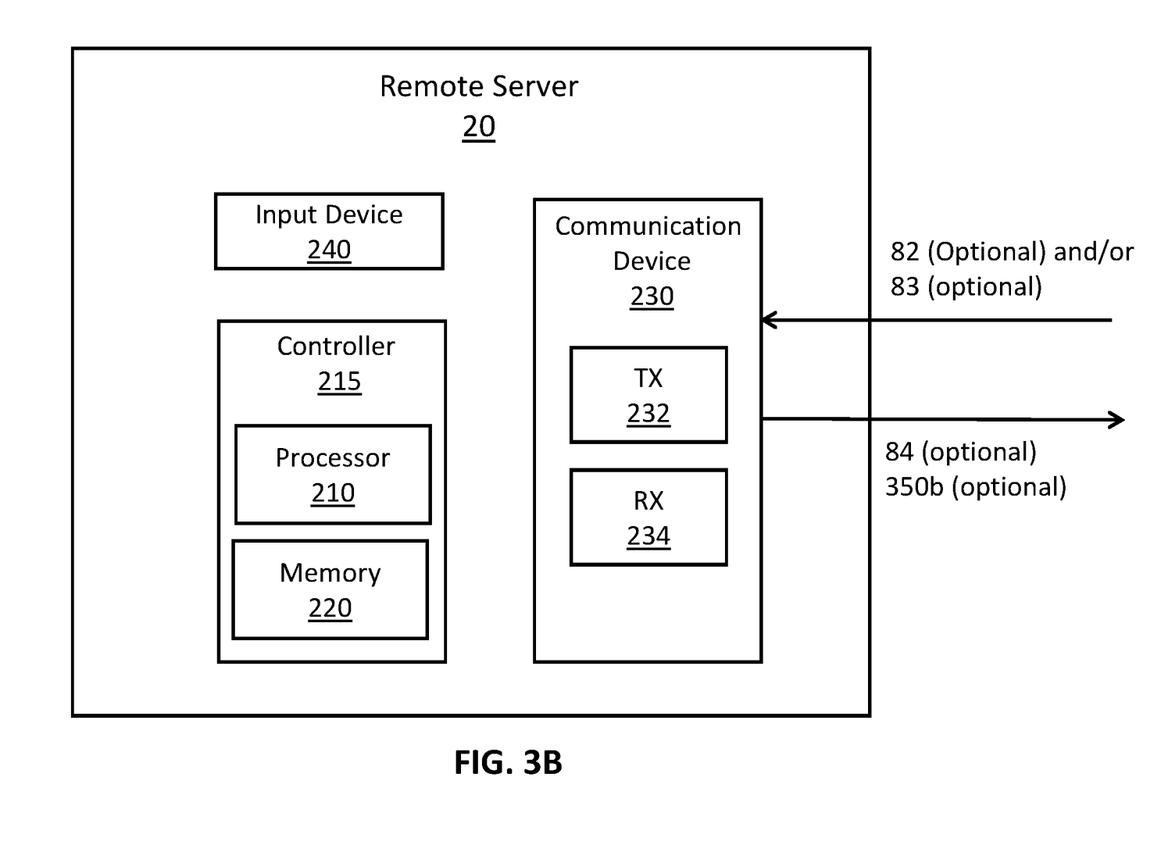
FIG. 3B is a block diagram illustrating an example remote server according to an embodiment of the present disclosure.

FIG. 3A is a block diagram illustrating an example emergency subscriber device 100 according to an embodiment of the present disclosure. FIG. 3B is a block diagram illustrating an example remote server 20 according to an embodiment of the present disclosure.

In one embodiment, the emergency subscriber device 100 can be installed as a part of the EV 10, or a wearable or portable device attached to the EV 10. The emergency subscriber device 100 is configured to generate/process/transmit a portion of the Data 80.

Referring particularly to FIG. 3A, the emergency subscriber device 100 includes a controller 115, an input device 140, an output device 150, a communication device 130 and one or more sensor devices 160. The controller 115 may include at least one processor 110 and a memory 120 coupled to the processor 110.

In one embodiment, when the EV 10 is in an emergency state where it heads to an emergency scene, the emergency subscriber device 100 may collect the EV-related data 82 using the sensor devices 160, determine a geofence 81 based on the collected EV-related data 82 using the controller 115, and transmit the geofence 81 to other vehicles 30a to 30d using the communication device 130. In another embodiment, the emergency subscriber device 100 may trigger an emergency state and transmit an emergency indication signal 83 to the remote server 20 using the transmitter 132. The emergency indication signal 83 indicates that the EV 10 is in an emergency state, and upon receiving the emergency indication signal 83, the remote server 20 may generate and transmit a geofence 84 to other vehicles 30a to 30d for providing an alert of the EV 10. In this case, the emergency indication signal 83 may include an ID of the EV, and optionally, various EV-related data such as a type of the EV, a location of the EV, a velocity of the EV, or the like.

The communication device 130 may include a transmitter 132 and a receiver 134. For example, the sensor data such as the location and the velocity can be collected using sensor devices 160 including, but are not limited to: an accelerometer, a global positioning system (GPS) receiver, a velocity sensor, a motion sensor, infrared light sensors, radar, laser radar, cameras, a gyroscope, or the like. The collected EV-related data 82 may include an ID of the EV, a type of the EV, a location of the EV, a velocity of the EV, or the like and may be stored in the memory 120 or other storage (not shown). For example, the transmission or suspension of data may be controlled by controlling activation or deactivation of the transmitter 132 based on the control signal 350.

The input device 140 can be, but is not limited to: a keyboard, a touch screen, an audio input system, a voice recognition system, or the like. The output device 150 can be, but is not limited to: a display, a screen, a speaker, a light, a siren, a visual system, an audio system, or the like.

In addition, the memory 120 includes program instructions executable by the processor 110 to perform functions or operations of the emergency subscriber device 100 described in the present disclosure. The processor 110 reads the stored data which have been collected from the sensor devices 160 and processes to generate the geofence 81 that will be transmitted to other vehicles 30a to 30d through the transmitter 132 of the communication device 130. In one embodiment, the receiver 134 of the communication device 130 can be used to receive a control or confirmation signal from the remote server 20.

The communication network 15 may be implemented using on a wireless communication technique based on radio-frequency identification (RFID), code division multiple access (CDMA), global system for mobile communication (GSM), wideband CDMA, CDMA-2000, time division multiple access (TDMA), long term evolution (LTE), wireless LAN, Bluetooth®, or the like. The communication device 130 may be implemented to support at least one of the above-mentioned communication techniques.

Referring further to FIG. 2B, the remote server 20 includes a controller 215 which may include a processor 210 and a memory 220 coupled to the processor 210, a communication device 230, and input device 240. The remote server 20 may reside on a network infrastructure or on a third-party service provider, such as a cloud storage and computing system.

The communication device 230 includes a transmitter 232 and a receiver 234. The communication device 230 may be implemented to support at least one of the above-mentioned communication techniques such as RFID, CDMA, GSM, wideband CDMA, CDMA-2000, TDMA, LTE, wireless LAN, Bluetooth®, or the like. The input device 240 can be, but is not limited to: a keyboard, a touch screen, an audio input system, a voice recognition system, or the like.

The suspension of the Data 80 from being transmitted is controlled using the control signal 350 (e.g., 350a of FIG. 3A and 350b of FIG. 3B) which can be provided by the emergency subscriber device 100 or the remote server 20.

Example of Control Signal being Provided by Emergency Subscriber Device

In one embodiment, the control signal 350a can be provided by the controller 115 of the emergency subscriber device 100 based on a user (e.g., operator of the EV 10) input through the input device 140. By way of example only, a selection menu for either a normal mode and at least one stealth mode may be implemented in the input device 140, as exemplary depicted in FIG. 4.

Figure 4:
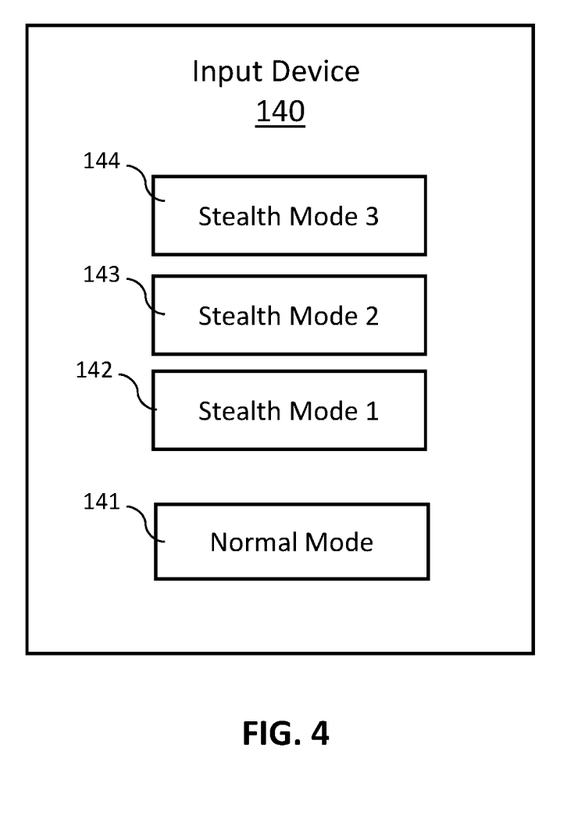
FIG. 4 depicts an example selection menu of an input device according to an embodiment of the present disclosure.

In the example selection menu shown in FIG. 4 where a normal mode 141 and three stealth modes 142 to 144 are provided, it will be apparent that the number of stealth modes implemented in the input device 140 can be one, two, or more than three. For example, the selection menu may include a specific button, or the like which allows the user to selectively suspend specific data (e.g., geofence, location, velocity, or ID of the EV 10).

In another embodiment, the control signal 350a is provided by the controller 115 of the emergency subscriber device 100 based on program instructions stored in the memory 120. For example, the controller 115 receives one or more program input parameters through the input device 140 or the sensor device 160 and determines one of the normal mode and the at least one stealth mode in which the EV 10 shall be operated, based on the program instructions and/or the one or more program input parameters. In this case, the one or more program input parameters may include, but are not limited: a current location, a velocity, ID, etc. of the EV 10, a current time, or the like.

Figure 5A:
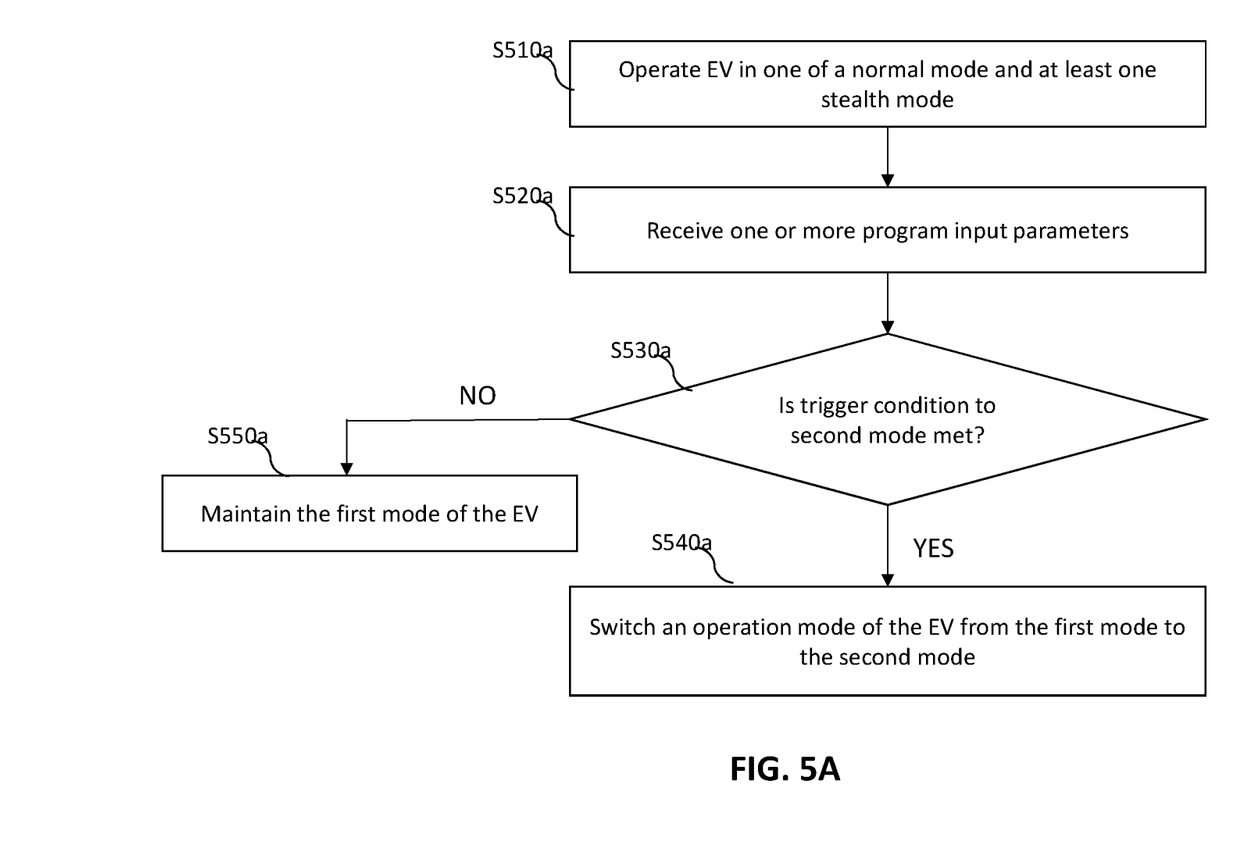
FIG. 5A depicts an example flow chart as to how the operation mode of an EV is controlled according to program instructions when the control signal is generated by the EV according to an embodiment of the present disclosure.

FIG. 5A depicts an example flow chart explaining as to how the operation mode of the EV 10 is controlled according to program instructions when the control signal is generated by the EV according to an embodiment of the present disclosure.

Referring to FIG. 5A, in step S510a, the EV 10 may be operated in one (e.g., referred to as a "first mode") of the normal mode and the at least one stealth mode.

In addition, the controller 115 of the emergency subscriber device 100 may receive one or more program input parameters from the sensor device 160, the remote server 20, or another storage mediums (S520a) and determines if a trigger condition for the first mode to be switched to another mode (e.g., referred to as a "second mode") of the normal mode and the at least one stealth mode (S530a). It is noted that the terms "first mode" and "second mode" are only used in the specification of the present application for the sake of description, but are not necessarily applied to the claims in a same manner.

If the controller 115 determines based on the received program input parameters and/or the program instructions that the trigger condition is met (YES), the controller 115 may generate a control signal 350a to switch the operation mode of the EV 10 (more particularly, e.g., emergency subscriber device 100) from the first mode to the second mode (S540a). For example, if it is assumed in S510a that the EV 10 is operated in the normal mode, the operation mode of the EV 10 will be switched to one of the at least one stealth mode. As a further example, if it is assumed in S510a that the EV 10 is operated in one of the at least one stealth mode, the operation mode of the EV 10 will be switched to the normal mode or another of the at least one stealth mode.

If the controller 115 determines based on the received program input parameters and/or the program instructions that the trigger condition is not met (NO), the controller 115 might not generate the control signal 350a to maintain the current operation mode (e.g., the first mode) of the EV 10 (more particularly, e.g., emergency subscriber device 100).

Example of Control Signal being Provided by Remote Server

In one embodiment, the control signal 350b can be provided by the controller 215 of the remote server 20 based on a user (e.g., operator of the remote server 20 at the headquarter 25) input through the input device 240. A selection menu for either a normal mode and at least one stealth mode may be implemented in the input device 240. The selection menu of the input device 240 has a similar feature to the selection menu of the input device 140. Thus, duplicate description thereof will be omitted for the sake of simplicity.

In another embodiment, the control signal 350b can be provided by the controller 215 of the remote server 20 based on program instructions stored in the memory 220. For example, the controller 215 may receive one or more program input parameters from the emergency subscriber device 100 and determine one of the normal mode and the at least one stealth mode in which the EV 10 is operated based on the program instructions and/or the one or more program input parameters. In this case, the one or more program input parameters may include a current location, a velocity, ID, etc. of the EV 10 and a current time.

Figure 5B:
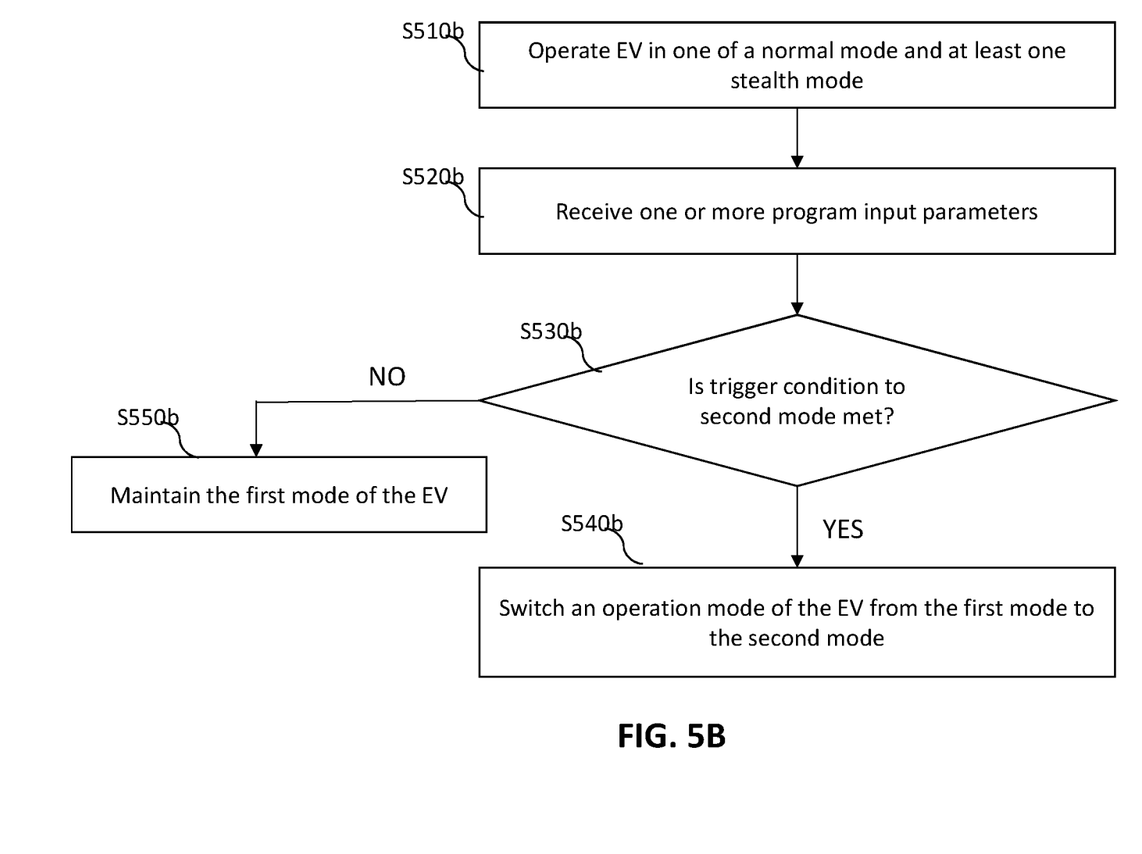
FIG. 5B depicts an example flow chart as to how the operation mode of an EV is controlled according to program instructions when the control signal is generated by a remote server according to an embodiment of the present disclosure.

FIG. 5B depicts an example flow chart explaining as to how the operation mode of an EV is controlled according to program instructions when the control signal is generated by the remote server 20 according to an embodiment of the present disclosure.

Referring to FIG. 5B, in step S510b the EV 10 may be operated in one (e.g., referred to as a "first mode") of the normal mode and the at least one stealth mode.

In addition, the controller 215 of the remote server 20 may receive one or more program input parameters from the emergency subscriber device 100 (S520b) and may determine if a trigger condition for the first mode to be switched to another mode (e.g., referred to as a "second mode") of the normal mode and the at least one stealth mode (S530b).

If the controller 215 determines based on the received program input parameters and/or the program instructions that the trigger condition is met (YES), the controller 215 may generate a control signal 350b and transmit the control signal 350b to the emergency subscriber device 100 in order to switch the operation mode of the EV 10 (more particularly, e.g., emergency subscriber device 100) from the first mode to the second mode (S540b). For example, if it is assumed in S510b that the EV 10 is operated in the normal mode, the operation mode of the EV 10 will be switched to one of the at least one stealth mode. As a further example, if it is assumed in S510b that the EV 10 is operated in one of the at least one stealth mode, the operation mode of the EV 10 will be switched to the normal mode or another of the at least one stealth mode.

If the controller 215 determines based on the received program input parameters and/or the program instructions that the trigger condition is not met (NO), the controller 215 might not generate the control signal 350b, so that the current operation mode (e.g., the first mode) of the EV 10 can be maintained.

Figure 6:
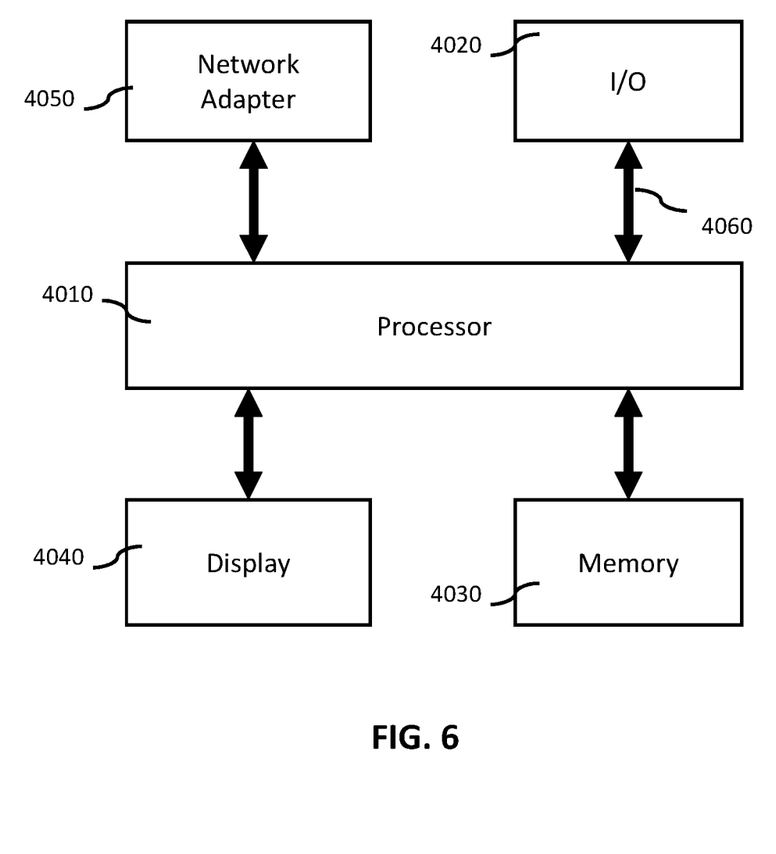
FIG. 6 is a block diagram of a computing system according to an embodiment of the present disclosure.

FIG. 6 is a block diagram of a computing system 4000 according to an exemplary embodiment of the present disclosure.

Referring to FIG. 6, the computing system 4000 may be used as a platform for performing: the functions or operations described hereinabove with respect to at least one of the emergency subscriber device 100 and the remote server 20; and the methods described with reference to FIGS. 5A and 5B.

Referring to FIG. 6, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the emergency subscriber device 100 and the remote server 20; and the methods described with reference to FIGS. 5A and 5B. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the emergency subscriber device 100 and the remote server 20; and the methods described with reference to FIGS. 5A and 5B. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth®, ZigBee®, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A control system for operating a stealth mode of an emergency vehicle (EV), comprising:
   a memory storing one or more program instructions executable by a processor;
   the processor coupled to the memory, configured to:
      receive input data including at least one of a selection input from an operator or one or more program input parameters;
      determine a data operation mode based on the received input data, wherein the data operation mode is one of a normal mode and one or more stealth modes; and
      generate a control signal based on the determined operation mode,
   wherein when the data operation mode is one of the one or more stealth modes, the control signal is adapted to control an emergency subscriber device of the EV to suspend a transmission of the at least one data among candidate suspended data, and
   wherein the control system is included in a management server which is remotely located from the emergency subscriber device and in communication with the emergency subscriber device.

2. The control system of claim 1, wherein the one or more stealth modes include a first stealth mode and a second stealth mode, and the candidate suspended data include first data and second data, and
wherein the control signal is adapted to control the emergency subscriber device:
when the data operation mode is the first stealth mode, suspend the first data from being transmitted and transmit the second data; and
when the data operation mode is the second stealth mode, suspend the second data from being transmitted and transmit the first data.

3. The control system of claim 1, wherein the one or more stealth modes includes a first stealth mode having a first security level and a second stealth mode having a second security level higher than the first security level, and the candidate suspended data include first data and second data.

4. The control system of claim 3, wherein the control signal is adapted to control the emergency subscriber device to:
suspend both the first data and the second data from being transmitted when the data operation mode is the first stealth mode; and
suspend the second data from being transmitted and transmit the first data when the data operation mode is the second stealth mode.

5. The control system of claim 4, wherein the first data has a higher security level than the second data.

6. The control system of claim 3, wherein when the data operation mode is one of the one or more stealth modes, the control signal is adapted to control the emergency subscriber device to suspend all data of the candidate suspended data from being transmitted.

7. The control system of claim 1, wherein the processor is further configured to, based on the program instructions:
determine the one or more program input parameters associated with the EV;
determine the data operation mode based on the one or more program input parameters; and
generate the control signal pertaining to the determined data operation mode.

8. The control system of claim 1, wherein the one or more program input parameters comprise at least one of a current location of the EV, a velocity of the EV, identification of the EV, a current time.

9. The control system of claim 1, wherein the candidate suspended data include EV-related data or data generated by an operator of the EV.

10. The control system of claim 9, wherein the EV-related data comprise a location of the vehicle, a velocity of the vehicle, and an ID of the EV.

11. The control system of claim 9, wherein the data generated by the operator of the EV comprise a conversation message of the operator with another individual at a remote site, and the conversation message comprises information of:
an occurrence of an event; and
details associated with the event.

12. A control method for operating a stealth mode of an emergency vehicle (EV), comprising:
receiving input data including at least one of a selection input from an operator or one or more program input parameters;
determining a data operation mode based on the received input data, wherein the data operation mode is one of a normal mode and one or more stealth modes; and
generating a control signal based on the determined operation mode, and
wherein when the data operation mode is one of the one or more stealth modes, the control signal is adapted to control an emergency subscriber device of the EV to suspend a transmission of at least one data among candidate suspended data, and
wherein the control signal is generated in a management server which is remotely located from the emergency subscriber device and the EV and in communication with the emergency subscriber device and the EV.

13. The control method of claim 12, wherein the one or more stealth modes includes a first stealth mode having a first security level and a second stealth mode having a second security level higher than the first security level.

14. The control method of claim 13, wherein the control signal is adapted to control the emergency subscriber device to:
suspend both the first data and the second data from being transmitted when the data operation mode is the first stealth mode; and
suspend the second data from being transmitted and transmit the first data when the data operation mode is the second stealth mode.

15. The control method of claim 14, wherein the first data has a higher security level than the second data.

16. The control method of claim 12, further comprising:
when the EV is operated in one of the one or more stealth modes, determining the operation mode be the normal mode, and
generating the control signal adapted to control the emergency subscriber device to release the EV from the one of the one or more stealth modes.

17. The control method of claim 12, further comprising:
when the first device is operated in the normal mode,
determining the operation mode be one of the one or more stealth modes,
identifying third data as a portion of the at least one data based on the determined operation mode, and
generating the control signal adapted to control the emergency subscriber device to suspend the third data from being transmitted.

18. A non-transitory computer-readable storage medium having computer readable program instructions, the computer readable program instructions read and executed by at least one processor for performing a control method for operating a stealth mode of an emergency vehicle (EV), comprising:
receiving input data including at least one of a selection input from an operator or one or more program input parameters;
determining a data operation mode based on the received input data, wherein the data operation mode is one of a normal mode and one or more stealth modes; and
generating a control signal based on the determined operation mode, and
wherein when the data operation mode is one of the one or more stealth modes, the control signal is adapted to control an emergency subscriber device of the EV to suspend a transmission of at least one data among candidate suspended data, and
wherein the control signal is generated in a management server which is remotely located from the emergency subscriber device and the EV and in communication with the emergency subscriber device and the EV.

19. The non-transitory computer-readable storage medium of claim 18, wherein the one or more stealth modes includes a first stealth mode having a first security level and a second stealth mode having a second security level higher than the first security level.

20. The non-transitory computer-readable storage medium of claim 19, wherein the control signal is adapted to control the emergency subscriber device:
   suspend both the first data and the second data from being transmitted when the data operation mode is the first stealth mode; and
   suspend the second data from being transmitted and transmit the first data when the data operation mode is the second stealth mode.

21. The non-transitory computer-readable storage medium of claim 20, wherein the first data has a higher security level than the second data.

22. The non-transitory computer-readable storage medium of claim 18, further comprising:
   when the EV is operated in one of the one or more stealth modes, determining the operation mode be the normal mode, and
   generating the control signal adapted to control the emergency subscriber device to release the EV from the one of the one or more stealth modes.

23. The non-transitory computer-readable storage medium of claim 18, further comprising:
   when the EV is operated in the normal mode, determining the operation mode be one of the one or more stealth modes,
   identifying third data as a portion of the at least one data based on the determined operation mode, and
   generating the control signal adapted to control the emergency subscriber device to suspend the third data from being transmitted.

* * * * *